(12) United States Patent
Miyazawa et al.

(10) Patent No.: US 10,185,846 B2
(45) Date of Patent: Jan. 22, 2019

(54) IC CARD READER

(71) Applicant: NIDEC SANKYO CORPORATION, Suwa-gun, Nagano (JP)

(72) Inventors: Shinya Miyazawa, Nagano (JP); Mamoru Mizawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/563,063

(22) PCT Filed: Mar. 29, 2016

(86) PCT No.: PCT/JP2016/060117
§ 371 (c)(1),
(2) Date: Sep. 29, 2017

(87) PCT Pub. No.: WO2016/158946
PCT Pub. Date: Oct. 6, 2016

(65) Prior Publication Data
US 2018/0341792 A1   Nov. 29, 2018

(30) Foreign Application Priority Data
Mar. 30, 2015   (JP) ................................. 2015-068485

(51) Int. Cl.
*G06K 7/00* (2006.01)
*G06K 13/12* (2006.01)
*G06K 13/063* (2006.01)

(52) U.S. Cl.
CPC ......... *G06K 7/0026* (2013.01); *G06K 7/0069* (2013.01); *G06K 13/063* (2013.01); *G06K 13/12* (2013.01)

(58) Field of Classification Search
CPC .... G06K 7/0026; G06K 7/0021; G06K 13/08; G06K 13/085; G06K 7/0086;
(Continued)

(56) References Cited

U.S. PATENT DOCUMENTS 5,045,674 A * 9/1991 Mita .................... G06K 7/0021
235/439
6,776,338 B2 * 8/2004 Watanabe ............ G06K 7/0021
235/441
(Continued)

FOREIGN PATENT DOCUMENTS

JP   H09147064 A   6/1997
JP   10027220 A    1/1998
(Continued)

OTHER PUBLICATIONS

International Search Report corresponding to Application No. PCT/JP2016/060117; dated Jun. 14, 2016.

*Primary Examiner* — Seung H Lee
(74) *Attorney, Agent, or Firm* — Cantor Colburn LLP

(57) ABSTRACT

A contact type card reader may include a card conveying passage, a card conveying mechanism, a contact block having a contact spring structured to contact the external connection terminal of the card; a guide mechanism; a block urging member; a first stopper; and a second stopper. The guide mechanism may guide the contact block to a standby position, a communication position, and a card eject position. At the standby position and the card eject position, the contact block may be disposed on a first direction side relative to where the contact block is disposed at the communication position. The contact block may include a block-shaped spring holder; a turning; and a stopper urging member.

7 Claims, 6 Drawing Sheets

(58) Field of Classification Search
CPC .......... G06K 13/0893; G06K 13/103; G06K 7/0004; G06K 7/0073; G06K 7/084
See application file for complete search history.

(56) References Cited

U.S. PATENT DOCUMENTS

| | | | |
|---|---|---|---|
| 6,824,062 B2 * | 11/2004 | Hirasawa | G06K 13/08 |
| | | | 235/479 |
| 7,185,822 B2 * | 3/2007 | Nagata | G06K 7/0021 |
| | | | 235/483 |
| 9,489,547 B2 * | 11/2016 | Watanabe | G06K 7/0069 |
| 9,519,846 B2 * | 12/2016 | Uchiyama | G06K 7/0026 |

FOREIGN PATENT DOCUMENTS

| | | | |
|---|---|---|---|
| JP | 2001351072 | | 12/2001 |
| JP | 2003168080 | | 6/2003 |
| JP | 2003178267 A | * | 6/2003 |
| JP | 2003242450 | | 8/2003 |

\* cited by examiner

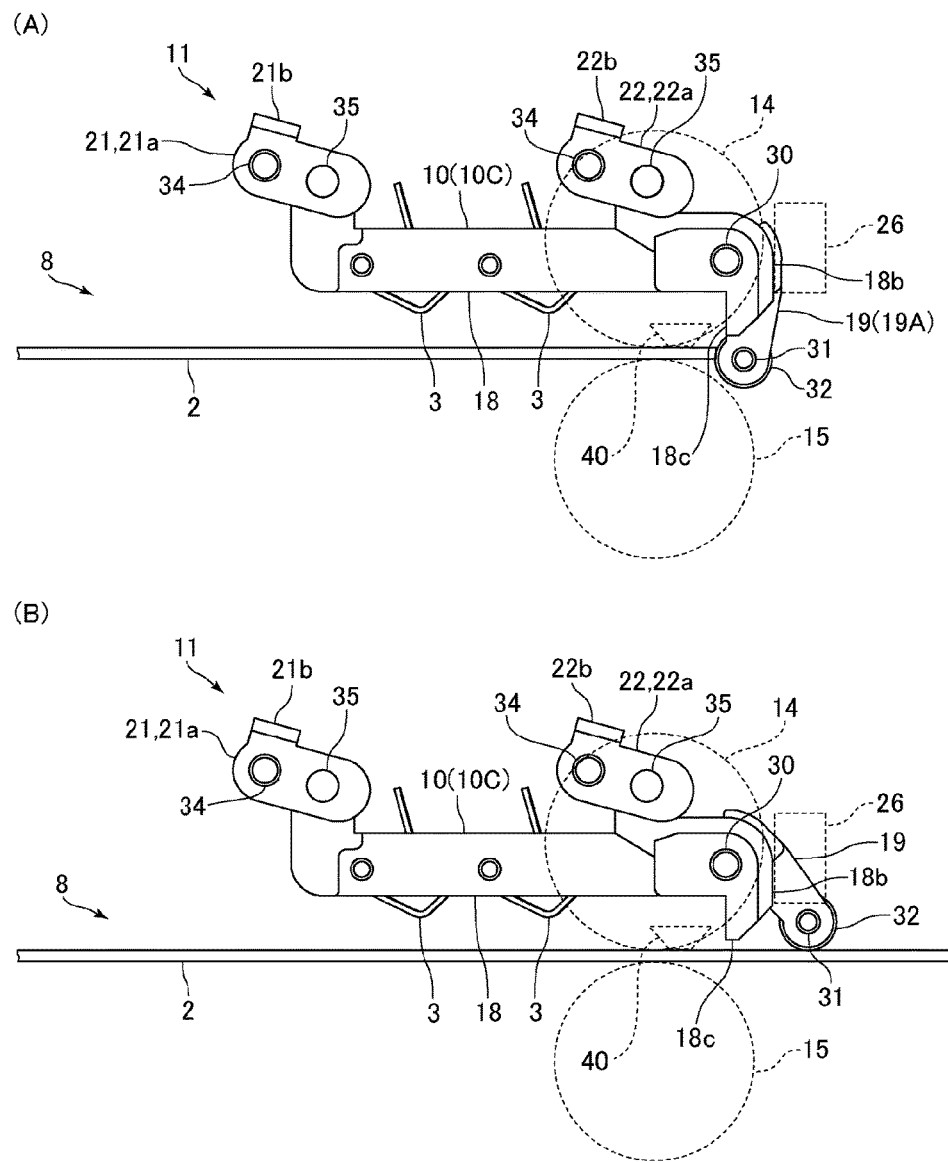
FIG. 6
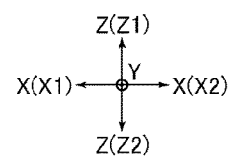

IC CARD READER

CROSS REFERENCE TO RELATED APPLICATIONS

This is the U.S. national stage of application No. PCT/JP2016/060117, filed on Mar. 29, 2016. Priority under 35 U.S.C. § 119(a) and 35 U.S.C. § 365B is claimed from Japanese Application No. 2015-068485, filed on Mar. 30, 2015; the disclosure of which are incorporated herein by reference.

TECHNICAL FIELD

At least an embodiment of the present invention relates to a contact type IC card reader provided with an IC contact spring that is contacted with an external connection terminal of an IC chip formed on a surface of a card.

BACKGROUND

Conventionally, a contact type IC card reader has been known, which has a card collecting function of collecting a card in an inside a card reader (see, for example, Patent Literature 1). An IC card reader described in Patent Literature 1 is formed with a card conveying passage where a card inserted through a card insertion port is conveyed. The IC card reader includes: a card conveying mechanism that conveys a card along the card conveying passage; an IC contact spring that is contacted with an external connection terminal of an IC contact formed on the card; a contact holder that holds the IC contact spring; and a tension coil spring that urges the contact holder toward the card insertion port. The contact holder includes an ascending and descending hook, and a compression coil spring that urges the ascending and descending hook toward the card conveying passage. The contact holder is formed with a projection, and this projection is inserted into a guide groove formed in a card reader main body.

Further, in the card reader described in Patent Literature 1, the card reader main body is provided with a hook lifting member that moves the ascending and descending hook in a direction separated from the card conveying passage against an urging force of the compression coil spring. In the card reader, the ascending and descending hook urged by the compression coil spring is located at a position where a card conveyed along the card conveying passage is abutted with the ascending and descending hook. When the card which has been abutted with the ascending and descending hook is conveyed toward a rear side of the card reader, the contact holder moves in a direction closer to the card conveying passage while moving toward the rear side of the card reader by the action of the projection of the contact holder and the guide groove. The IC contact spring is then contacted with an external connection terminal on the card to establish data communication with the card.

Also in the card reader described in Patent Literature 1, a card is collected when the card is conveyed to the rear side of the card reader relative to the contact holder. In collecting the card, the card is further conveyed toward the rear side of the card reader in the state in which the IC contact spring is in contact with an external connection terminal on the card. When the card is further conveyed toward the rear side of the card reader, the contact holder moves toward the rear side of the card reader, so that the ascending and descending hook is contacted with the hook lifting member. When the ascending and descending hook is contacted with the hook lifting member, then, the ascending and descending hook moves in a direction separated from the card conveying passage, so that the card can be conveyed to the rear side of the card reader relative to the contact holder. In this state, the card is further conveyed toward the rear side of the card reader. The card is thus collected.

A processing device for an IC card has also been conventionally known (see, for example, Patent Literature 2). A processing device described in Patent Literature 2 includes: a stacker in which a card is accommodated in a stacked manner; a card conveying passage where a card sent out from the stacker is conveyed; a card conveying mechanism that conveys a card along the card conveying passage; an IC contact spring that is contacted with an external connection terminal on a card; and a contact holder that holds the IC contact spring. The contact holder is connected to a parallel link mechanism having two arms. One of the two arms is mounted with a tension coil spring that urges the contact holder toward the stacker. Further, the contact holder is formed with an abutting part with which an end of a card sent out from the stacker is abutted.

In the processing device described in Patent Literature 2, when a card is sent out from the stacker, the abutting part of the contact holder is located at a position where the card conveyed along the card conveying passage is abutted with the abutting part. When the card sent out from the stacker is abutted with the abutting part and then is further conveyed in a direction away from the stacker, the contact holder moves in a direction closer to the card conveying passage while moving in a conveying direction of the card by the action of the parallel link mechanism. The IC contact spring is then contacted with an external connection terminal on the card to establish data communication with the card. Further, in the processing device, when the card is further conveyed in the direction away from the stacker, the contact holder moves in a direction separated from the card conveying passage while moving in the conveying direction of the card. When the contact holder moves in the direction separated from the card conveying passage, the abutting part of the contact holder also moves in the direction separated from the card conveying passage. Therefore, the card is passed by the position where the contact holder is located, and then is further conveyed in the direction away from the stacker.

Patent Literature 1: Japanese Patent Laid-Open No. Hei 10-27220

Patent Literature 2: Japanese Patent Laid-Open No. Hei 9-147064

According to the IC card reader described in Patent Literature 1, in collecting a card, the card is further conveyed toward the rear side of the card reader with the IC contact spring contacted with a surface of the card. Therefore, the IC contact spring may cause damage to the card. When the contact holder and the parallel link mechanism each described in Patent Literature 2 are applied to the IC card reader described in Patent Literature 1, in collecting a card, the IC contact spring moves away from the card along with the movement of the card. Therefore, occurrence of damage to the card in collecting the card can be suppressed.

However, when the contact holder and the parallel link mechanism in Patent Literature 2 are applied to the IC card reader described in Patent Literature 1, in collecting a card, it is necessary to considerably move the entire contact holder in the direction separated from the card conveying passage by means of the parallel link mechanism so that the card can be passed by the position where the contact holder is located. For this reason, the IC card reader requires a large space for considerably moving the entire contact holder, which results in upsizing of the IC card reader.

SUMMARY

Therefore, in view of the problem described above, at least an embodiment of the present invention provides a contact type IC card reader having a card collecting function, the IC card reader being capable of achieving miniaturization although occurrence of damage to a card owing to an IC contact spring in collecting the card can be suppressed.

To achieve the above, at least an embodiment of the present invention provides a contact type IC card reader provided with an IC contact spring that is contacted with an external connection terminal of an IC chip formed on a surface of a card, wherein a side, on which an insertion port for the card is formed, of the IC card reader is referred to as a front side, a side opposite to the front side is referred to as a rear side, one side in a thickness direction of the card inserted through the insertion port is referred to as a first direction side, and a side opposite to the first direction side is referred to as a second direction side, the IC card reader including: a card conveying passage where the card inserted through the insertion port is conveyed; a card conveying mechanism that conveys the card along the card conveying passage; an IC contact block that includes the IC contact spring; a guide mechanism that guides the IC contact block so that the IC contact block moves in a state in which a posture of the IC contact block to the card conveying passage is maintained constant; a block urging member that urges the IC contact block toward the front side; a first stopper that restricts a moving range of the IC contact block toward the front side; and a second stopper that restricts a moving range of the IC contact block toward the rear side. The guide mechanism guides the IC contact block so that the IC contact block moves to a standby position where the IC contact block is abutted with the first stopper and is separated from the card located on the card conveying passage, by an urging force of the block urging member, a communication position where the IC contact spring is contacted with the external connection terminal on the card located on the card conveying passage, and a card eject position where the IC contact block is abutted with the second stopper and is separated from the card located on the card conveying passage. The IC contact block at the standby position and the IC contact block at the card eject position are disposed on the first direction side relative to the IC contact block at the communication position. The IC contact block includes: a block-shaped spring holder that holds the IC contact spring; a turning stopper that is mounted to a rear end side of the spring holder and is turnable with a width direction of the card as an axial direction of turning, the width direction being perpendicular to a conveying direction of the card and the thickness direction of the card; and a stopper urging member that urges the turning stopper toward a closing position where the turning stopper is protruded from the spring holder toward the second direction side to close the card conveying passage. When a rear end of the card conveyed toward the rear side by the card conveying mechanism is abutted with the turning stopper of the IC contact block located at the standby position, the turning stopper is pushed by the card, so that the IC contact block moves toward the rear side from the standby position to the communication position. When the card which has been abutted with the turning stopper of the IC contact block moved to the communication position is further conveyed toward the rear side by the card conveying mechanism, the turning stopper is pushed by the card, so that the IC contact block moves toward the rear side from the communication position to the card eject position. When the card which has been abutted with the turning stopper of the IC contact block moved to the card eject position is further conveyed toward the rear side by the card conveying mechanism, the turning stopper is turned toward the first direction side and the rear side, so that the card is passed by the second direction side of the turning stopper toward the rear side.

In the card reader according to at least an embodiment of the present invention, the IC contact block moves to the standby position where the IC contact block is abutted with the first stopper and is separated from the card located on the card conveying passage, the communication position where the IC contact spring is contacted with the external connection terminal on the card located on the card conveying passage, and the card eject position where the IC contact block is abutted with the second stopper and is separated from the card located on the card conveying passage, in the state in which the posture of the IC contact block to the card conveying passage is maintained constant. Further, in at least an embodiment of the present invention, when the card which has been abutted with the turning stopper of the IC contact block moved to the communication position is further conveyed toward the rear side by the card conveying mechanism, the turning stopper is pushed by the card, so that the IC contact block moves toward the rear side from the communication position to the card eject position. In at least an embodiment of the present invention, therefore, in collecting the card conveyed to the rear side, the IC contact spring is separated from the card along with the movement of the card. In at least an embodiment of the present invention, accordingly, occurrence of damage to the card owing to the IC contact spring in collecting the card can be suppressed.

Further, in at least an embodiment of the present invention, the IC contact block includes: the turning stopper that is mounted to the rear end side of the spring holder and is turnable with the width direction of the card as an axial direction of turning; and the stopper urging member that urges the turning stopper toward the closing position where the turning stopper is protruded from the spring holder toward the second direction side to close the card conveying passage. When the card which has been abutted with the turning stopper of the IC contact block moved to the card eject position is further conveyed toward the rear side by the card conveying mechanism, the turning stopper is turned toward the first direction side and the rear side, so that the card is passed by the second direction side of the turning stopper toward the rear side. In at least an embodiment of the present invention, therefore, as compared with the case that the entire IC contact block is moved to the extent that the card can be passed by the second direction side of the stopper fixed to the IC contact block like the processing device described in Patent Literature 2, the card can be passed toward the rear side of the IC contact block even when an amount of movement of the entire IC contact block is reduced. In at least an embodiment of the present invention, in other words, the amount of movement of the IC contact block can be reduced although the card can be passed toward the rear side of the IC contact block in order to collect the card. In at least an embodiment of the present invention, accordingly, a space for moving the IC contact block can be reduced. As a result, the IC card reader can be miniaturized. In at least an embodiment of the present invention, in other words, the IC card reader can be miniaturized although the occurrence of damage to the card owing to the IC contact spring in collecting the card can be suppressed.

In at least an embodiment of the present invention, the guide mechanism is, for example, a parallel link mechanism that includes a first arm turnably connected to a front end side of the spring holder, and a second arm turnably connected to the rear end side of the spring holder.

In at least an embodiment of the present invention, the rear end side of the spring holder is formed with a fixing stopper that is protruded toward the second direction side, an amount of protrusion of the fixing stopper in the second direction is smaller than an amount of protrusion of the turning stopper located at the closing position in the second direction, when the IC contact block is located at the communication position, the fixing stopper is located at a position where the rear end of the card is abuttable with the fixing stopper, and when the IC contact block is located at the card eject position, the fixing stopper is disposed on the first direction side relative to the card. According to this structure, when the IC contact block is located at the communication position, the fixing stopper is located at the position where the rear end of the card is abuttable with the fixing stopper. Therefore, even when the turning stopper that is turnable is mounted to the spring holder in order to miniaturize the IC card reader, the card can be surely stopped at a predetermined position by the fixing stopper, in performing data communication in such a manner that the IC contact spring is contacted with the external connection terminal on the card. Further, according to this structure, the fixing stopper is disposed on the first direction side relative to the card when the IC contact block is located at the card eject position. Therefore, the fixing stopper does not hinder the card from being passed toward the rear side of the IC contact block.

In at least an embodiment of the present invention, the fixing stopper is formed on both sides of the turning stopper in the width direction of the card. According to this structure, as compared with the case that the fixing stopper is formed on one side of the turning stopper in the width direction of the card, the tilting of the card (specifically, the tilting of the card in the conveying direction of the card as viewed in the thickness direction of the card) can be suppressed in performing data communication in such a manner that the IC contact spring is contacted with the external connection terminal on the card.

In at least an embodiment of the present invention, the card conveying passage is provided with a guide part that is protruded from the first direction side toward the second direction side and is structured to guide the card conveyed along the card conveying passage, when the IC contact block is located at the communication position, the guide part is disposed so as to be overlapped with the fixing stopper in the conveying direction of the card, when the IC contact block is located at the card eject position, a second direction-side end of the guide part is disposed on the second direction side relative to a second direction-side end of the fixing stopper, and the card is passed by the second direction side of the guide part in a course of movement of the IC contact block from the communication position to the card eject position. According to this structure, in the course of movement of the IC contact block from the communication position to the card eject position, the guide part is abutted from the first direction side with a tip end side of the card conveyed to the rear side, so that a tip end of the card lifted to the upper side by a frictional force generated between the card and the fixing stopper can be pushed toward the second direction side relative to the second direction-side end of the fixing stopper. Accordingly, the fixing stopper can be surely separated from the tip end of the card along with the movement of the card, so that the card can be surely ejected toward the rear side of the IC contact block.

In at least an embodiment of the present invention, a distal end side of the turning stopper is mounted with a roller that is rotatable with the width direction of the card as an axial direction of rotation. According to this structure, occurrence of damage to the card owing to the turning stopper in collecting the card can be prevented.

In at least an embodiment of the present invention, the IC card reader further includes a collecting box that is disposed on the rear side relative to the IC contact block and on the second direction side relative to the card conveying passage and is structured to collect the card. The turning stopper pushes the card passed by the second direction side of the turning stopper toward the rear side, toward the collecting box by an urging force of the stopper urging member. According to this structure, the card can be surely collected in the collecting box by use of the turning stopper.

As described above, in at least an embodiment of the present invention, a contact type IC card reader having a card collecting function can be miniaturized although occurrence of damage to a card owing to an IC contact spring in collecting the card can be suppressed.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 6A and 6B are explanatory views each showing movement of the IC contact block shown in FIG. 1.

DETAILED DESCRIPTION

Embodiments of the present invention will be described below with reference to the drawings.

(Schematic Structure of Card Reader)

Figure 1:
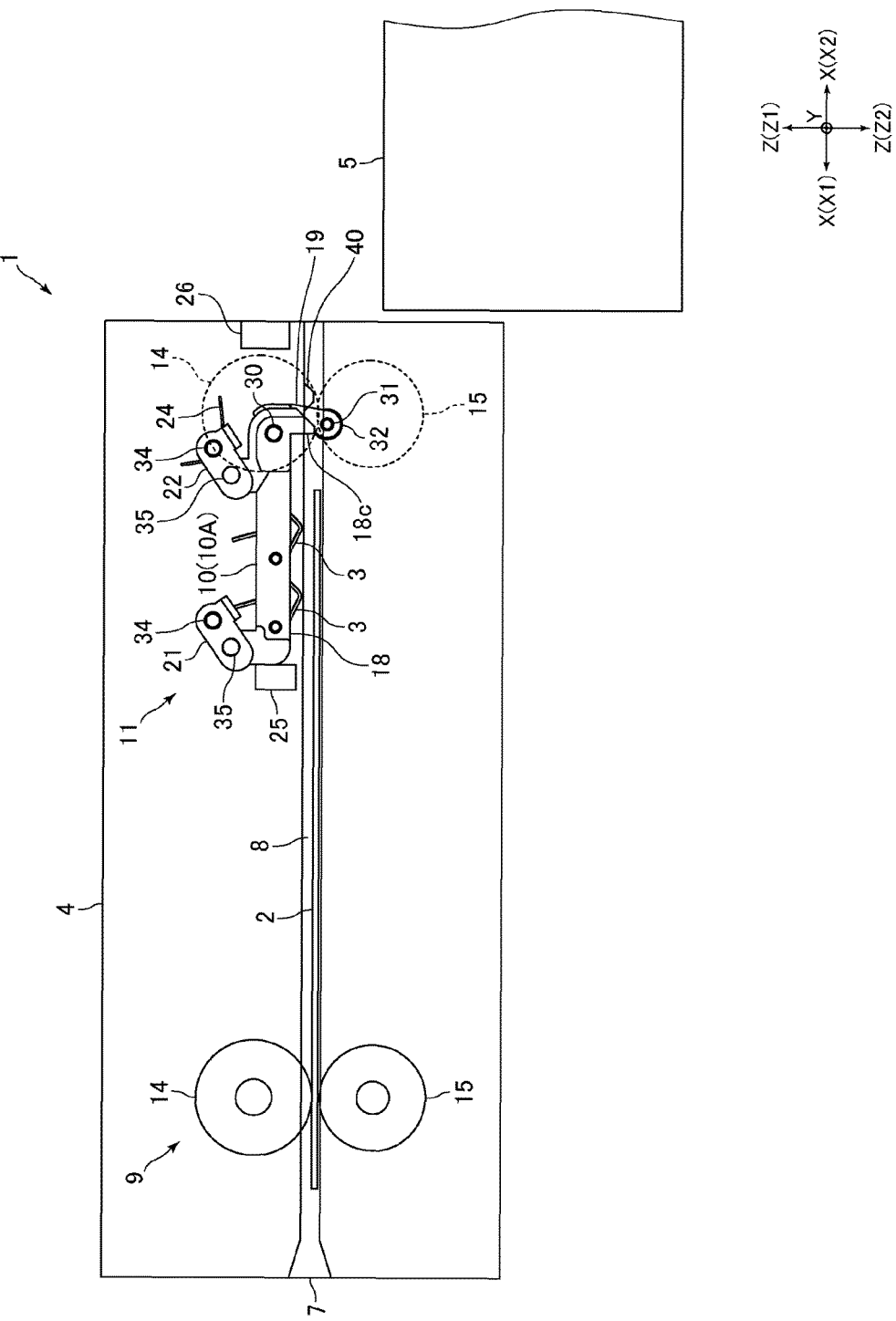
FIG. 1 is a schematic side view of an IC card reader in accordance with an embodiment of the present invention.
Figure 2:
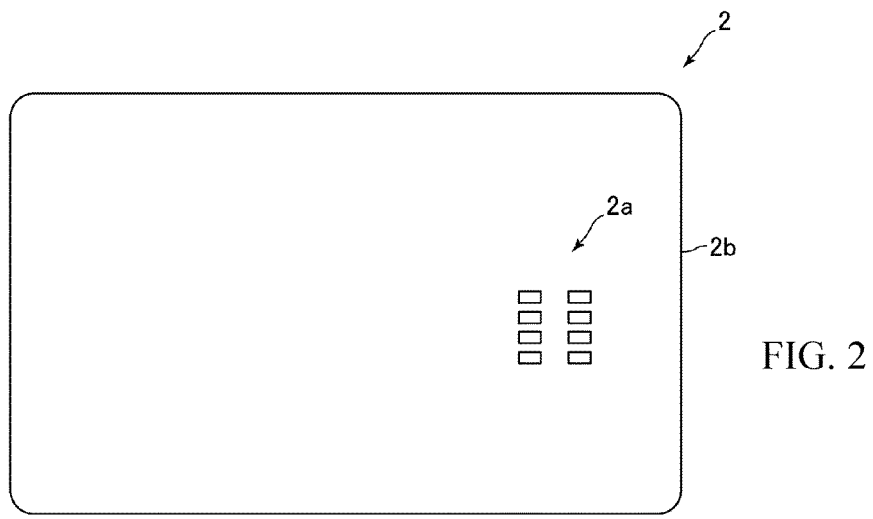
FIG. 2 is a plan view of a card shown in FIG. 1.

FIG. 1 is a schematic side view of an IC card reader 1 in accordance with an embodiment of the present invention. FIG. 2 is a plan view of a card 2 shown in FIG. 1.

The IC card reader 1 in this embodiment (hereinafter, referred to as a "card reader 1") is a device for performing at least one of reading of data recorded in the card 2 and recording of data to the card 2. Specifically, the card reader 1 is a contact type IC card reader provided with an IC contact spring 3 that is contacted with an external connection terminal 2a of an IC chip formed on a surface of the card 2, in order to perform data communication with the card 2. Further, the card reader 1 in this embodiment has a card collecting function of collecting the card 2 in an inside of the card reader 1 if necessary. The card reader 1 is mounted for use on a predetermined host apparatus (not shown).

The card reader 1 includes a card reader main body 4 and a collecting box 5 for collecting the card 2. The card reader main body 4 is formed with a card conveying passage 8 where the card 2 that is inserted through an insertion port 7 for the card 2 is conveyed. The card reader main body 4 includes a card conveying mechanism 9 that conveys the card 2 along the card conveying passage 8, an IC contact block 10 that includes the IC contact spring 3, and a parallel link mechanism 11 serving as a guide mechanism that guides the IC contact block 10. The card reader main body 4 also includes a magnetic head (not shown).

In this embodiment, the card 2 is conveyed in an "X" direction shown in FIG. 1 and the like. In other words, the "X" direction is a conveying direction of the card 2 that is conveyed along the card conveying passage 8. Further, a "Z" direction in FIG. 1 and the like perpendicular to the "X" direction is a thickness direction of the card 2 that is conveyed along the card conveying passage 8 (in other words, a thickness direction of the card 2 that is inserted through the insertion port 7), and a "Y" direction in FIG. 1 and the like perpendicular to the "X" direction and the "Z" direction is a width direction of the card 2 that is conveyed along the card conveying passage 8. In the following descriptions, the "X" direction is referred to as a "front and rear direction", the "Y" direction is referred to as a "right and left direction", and the "Z" direction is referred to as an "upper and lower direction". Further, an "X1" direction side on which the insertion port 7 is formed is referred to as a "front (forward)" side, an "X2" direction side opposite to the "X1" direction side is referred to as a "rear (back)" side, a "Z1" direction side is referred to as an "upper" side, and a "Z2" direction side opposite to the "Z1" direction side is referred to as a "lower" side. In this embodiment, the card reader 1 is disposed so that the upper and lower direction and a vertical direction are coincided with each other. Also in this embodiment, the upper side ("Z1" direction side) is a first direction side which is one side in the thickness direction of the card 2, and the lower side ("Z2" direction side) is a second direction side opposite to the first direction side.

The card 2 is a substantially rectangular-shaped card made of vinyl chloride whose thickness is about 0.7-0.8 mm. The card 2 is formed with a magnetic stripe (not shown) to which magnetic data are recorded. Further, the card 2 is incorporated with an IC chip (not shown), and a surface of the card 2 is formed with an external connection terminal 2a. As shown in FIG. 2, the external connection terminal 2a is formed on one end 2b side in a longitudinal direction of the card 2. The card 2 is inserted into the card reader main body 4 from the one end 2b side in the longitudinal direction of the card 2 in a state in which the face, on which the external connection terminal 2a is formed, is directed to the upper side and the longitudinal direction of the card 2 is substantially coincided with the front and rear direction. The card 2 is not necessarily formed with the magnetic stripe. In this case, the card reader main body 4 does not necessarily include the magnetic head.

The card conveying passage 8 is formed in a straight shape when viewed in the right and left direction. The card conveying mechanism 9 includes a drive roller 14 and a pad roller 15 for conveying the card 2. The drive roller 14 and the pad roller 15 are disposed so as to face each other in the upper and lower direction. The drive roller 14 is coupled to a driving motor (not shown) via a power transmission mechanism (not shown) including pulleys, a belt, and the like. The pad roller 15 is urged toward the drive roller 14.

The collecting box 5 has an open upper face and is formed in a substantially rectangular parallelepiped box shape. The collecting box 5 is disposed on a rear side of the card reader main body 4. Further, the collecting box 5 is disposed on the lower side relative to the card conveying passage 8.

(Structures of IC Contact Block, Parallel Link Mechanism, and Their Surrounding Portions)

Figure 3:
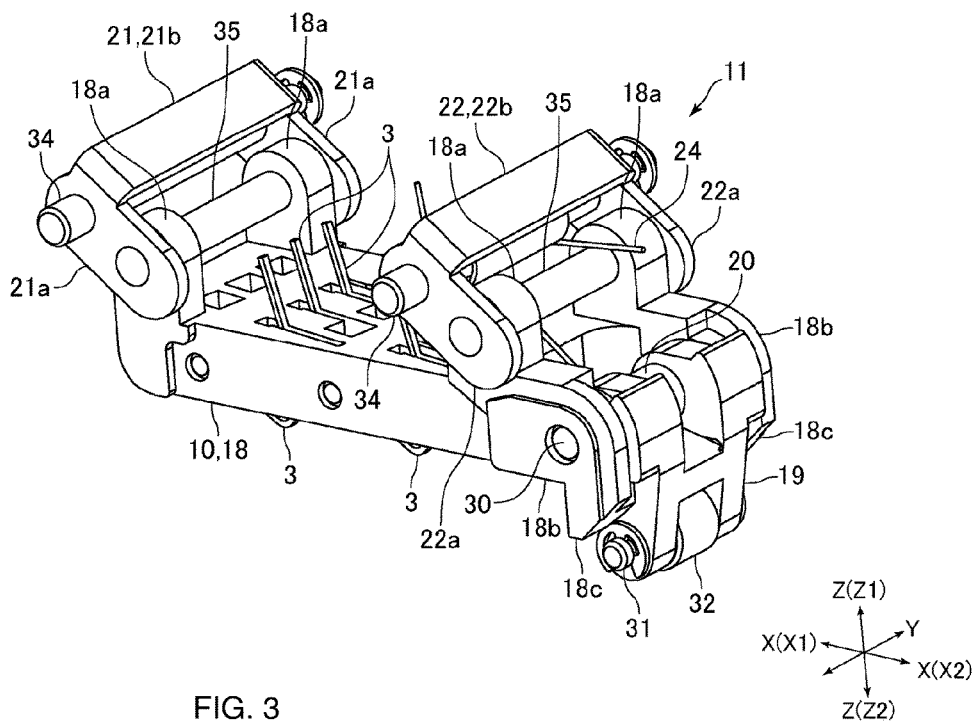
FIG. 3 is a perspective view of an IC contact block and a parallel link mechanism each shown in FIG. 1.
Figure 4:
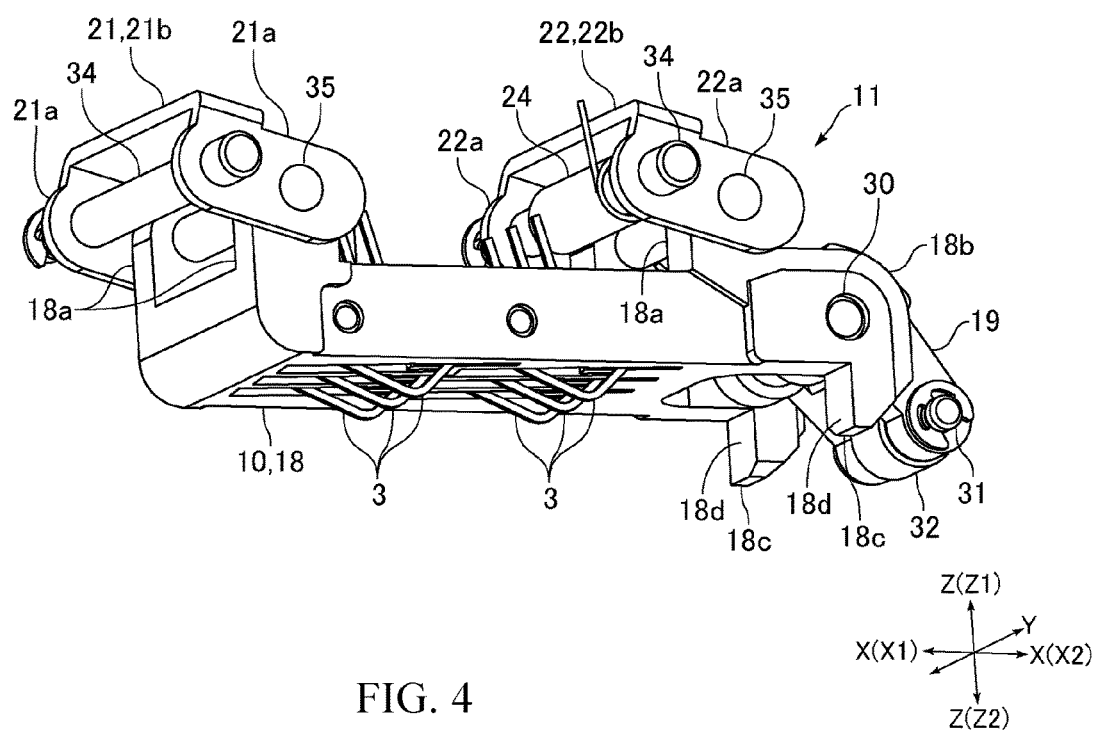
FIG. 4 is a perspective view of the IC contact block and the parallel link mechanism each shown in FIG. 3 and viewed from another direction.
Figure 5:
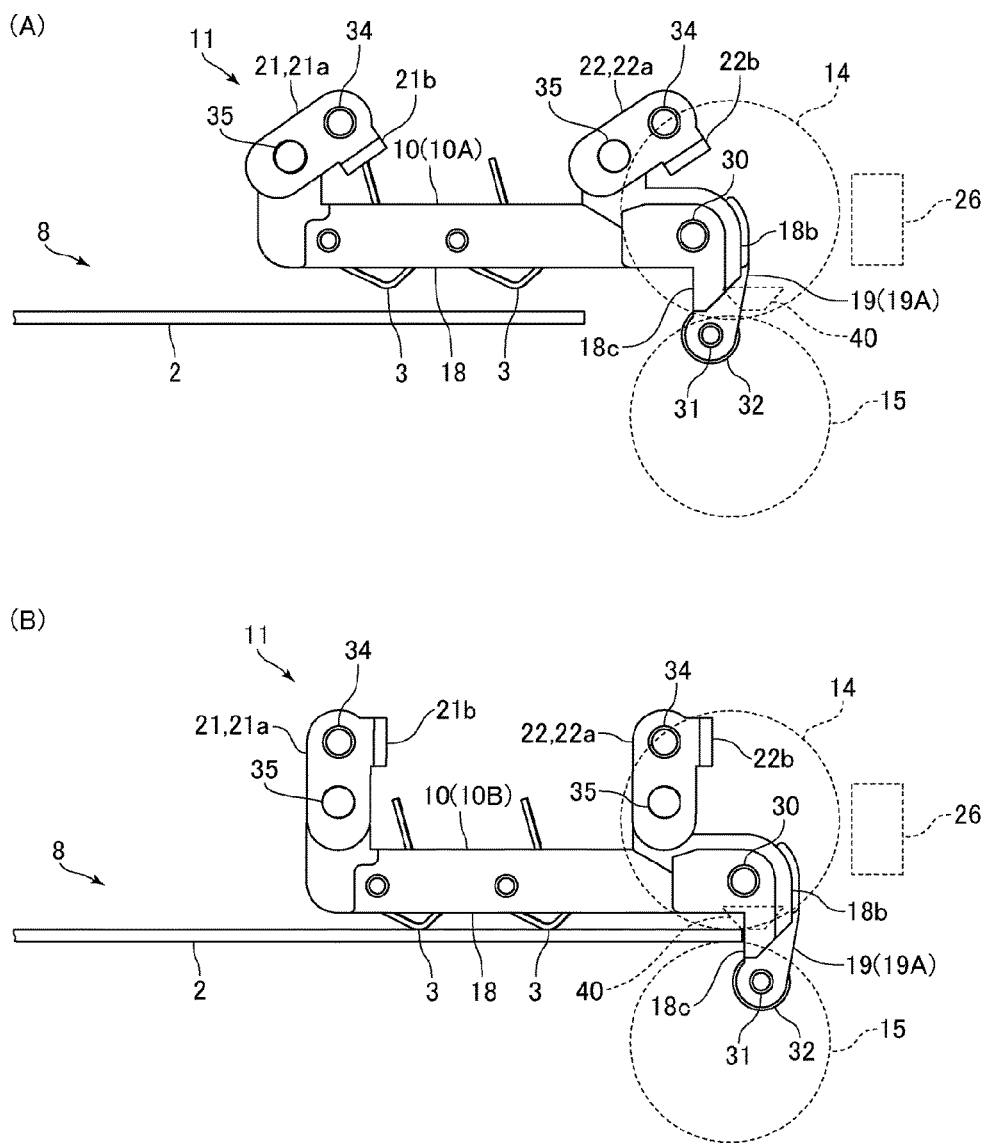
FIGS. 5A and 5B are explanatory views each showing movement of the IC contact block shown in FIG. 1.
Figure 5:
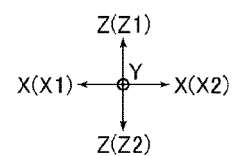
Figure 7:
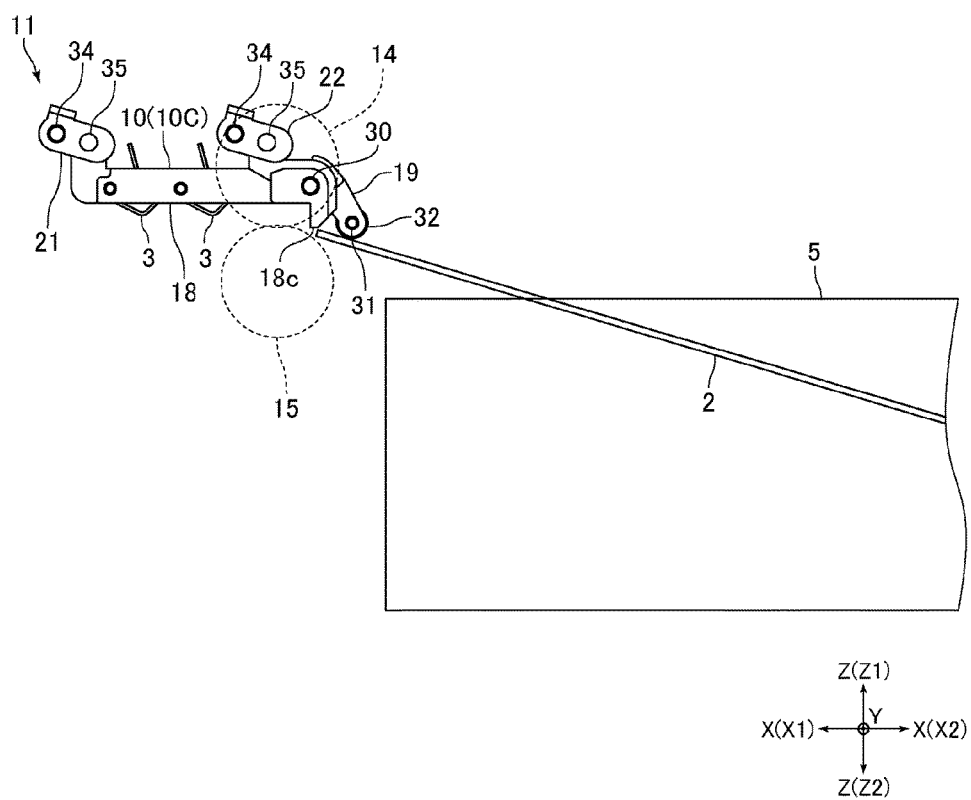
FIG. 7 is an explanatory view showing action of a turning stopper shown in FIG. 1.

FIG. 3 is a perspective view of the IC contact block 10 and the parallel link mechanism 11 each shown in FIG. 1. FIG. 4 is a perspective view of the IC contact block 10 and the parallel link mechanism 11 each shown in FIG. 3 and viewed from another direction. FIGS. 5A, 5B, 6A, and 6B are explanatory views each showing movement of the IC contact block 10 shown in FIG. 1. FIG. 7 is an explanatory view showing action of a turning stopper 19 shown in FIG. 1.

The IC contact block 10 is disposed on the rear end side of the card reader main body 4. Further, the IC contact block 10 is disposed so that the IC contact spring 3 faces the card conveying passage 8 from the upper side. The IC contact block 10 includes a spring holder 18 that is formed in a block shape and is structured to hold the IC contact spring 3, a turning stopper 19 that is turnably mounted to a rear end side of the spring holder 18, and a torsion coil spring 20 (see FIG. 3) serving as a stopper urging member that urges the turning stopper 19.

The parallel link mechanism 11 is disposed on an upper side of the IC contact block 10. The parallel link mechanism 11 includes an arm 21 serving as a first arm that is turnably connected to a front end side of the spring holder 18, and an arm 22 serving as a second arm that is turnably connected to the rear end side of the spring holder 18. The card reader main body 4 also includes a torsion coil spring 24 serving as a block urging member that urges the IC contact block 10 toward the front side, a stopper 25 serving as a first stopper that restricts a moving range of the IC contact block 10 toward the front side, and a stopper 26 serving as a second stopper that restricts a moving range of the IC contact block 10 toward the rear side. It should be noted that the torsion coil spring 24 is not shown in FIGS. 5A to 7.

The spring holder 18 is formed in a substantially rectangular parallelepiped shape that is flat in the upper and lower direction. The spring holder 18 is disposed to face the card conveying passage 8 from the upper side. An upper face side of the spring holder 18 is formed with a shaft insertion part 18a into which a connecting shaft 35 (to be described later) is inserted. The connecting shaft 35 structures a part of the parallel link mechanism 11. The shaft insertion part 18a is formed at four positions in total, that is, two positions on right and left ends on the front end side of the spring holder 18 and two positions on right and left ends on the rear end side of the spring holder 18. Further, the shaft insertion part 18a is formed to be protruded toward the upper side.

The rear end side of the spring holder 18 is formed with a protruded part 18b that is protruded toward the rear side. The protruded part 18b is formed at two positions on the right and left ends of the spring holder 18. A rear end side of the protruded part 18b (in other words, the rear end side of the spring holder 18) is formed with a fixing stopper 18c that is protruded toward the lower side. A front face 18d (see FIG. 4) of the fixing stopper 18c is formed in a flat face shape perpendicular to the front and rear direction. A space is formed between the two protruded parts 18b in the right and left direction, and a part of the turning stopper 19 is disposed in this space. In other words, the fixing stopper 18c is formed on both the sides of the turning stopper 19 in the right and left direction. A fixed shaft 30 is fixed to rear end sides of the two protruded parts 18b. The fixed shaft 30 is fixed to the protruded parts 18b so that an axial direction of the fixed shaft 30 and the right and left direction are coincided with each other.

The turning stopper 19 is formed in a substantially parallelepiped block shape. An upper end side of the turning stopper 19 is turnably held by the fixed shaft 30, so that the turning stopper 19 is turnable about the fixed shaft 30. In other words, the turning stopper 19 is turnable with the right and left direction as an axial direction of turning. The fixed shaft 30 is inserted through the torsion coil spring 20. The torsion coil spring 20 urges the turning stopper 19 toward a closing position 19A (a position shown in FIGS. 5A, 5B, and 6A) where the turning stopper 19 is protruded from the spring holder 18 toward the lower side to close the card conveying passage 8. In other words, the torsion coil spring 20 urges the turning stopper 19 in a clockwise direction shown in FIGS. 5A, 5B, 6A, and 6B about the fixed shaft 30. The spring holder 18 is formed with a stopper (not shown) that restricts a turning range of the turning stopper 19 in the clockwise direction. When the turning stopper 19 is located at the closing position 19A, the turning stopper 19 is abutted with the stopper, so that its turning in the clockwise direction is restricted.

An amount of protrusion of the turning stopper 19 located at the closing position 19A toward the lower side is larger than an amount of protrusion of the fixing stopper 18c toward the lower side. In other words, the amount of protrusion of the fixing stopper 18c toward the lower side is smaller than the amount of protrusion of the turning stopper 19 located at the closing position 19A toward the lower side. A lower end of the turning stopper 19 located at the closing position 19A is disposed on the lower side relative to a lower end of the fixing stopper 18c. Further, a distal end side of the turning stopper 19 is mounted with a shaft 31. The shaft 31 is disposed so that an axial direction of the shaft 31 and the right and left direction are coincided with each other. A roller 32 is rotatably mounted to the shaft 31. In other words, the roller 32 is mounted to the distal end side of the turning stopper 19 and is rotatable with the right and left direction as an axial direction of rotation. A part of the roller 32 is protruded toward a distal end side of the turning stopper 19 relative to a distal end of the turning stopper 19.

In addition to the arms 21 and 22 described above, the parallel link mechanism 11 also includes two turning center shafts 34 about which the arms 21 and 22 are turned respectively, and two connecting shafts 35 that respectively connect the arms 21 and 22 to the spring holder 18. The arm 21 and the arm 22 are formed to be identical in shape with each other. The arm 21 includes two shaft mounting parts 21a to which the turning center shaft 34 and the connecting shaft 35 are mounted respectively, and a connecting part 21b that connects the two shaft mounting parts 21a to each other. Likewise, the arm 22 includes two shaft mounting parts 22a to which the turning center shaft 34 and the connecting shaft 35 are mounted respectively, and a connecting part 22b that connects the two shaft mounting parts 22a to each other.

Each of the shaft mounting parts 21a and 22a is formed in a substantially elongated circular flat plate shape and is disposed so that a thickness direction of each of the shaft mounting parts 21a and 22a and the right and left direction are coincided with each other. The two shaft mounting parts 21a are disposed in a separated state with a predetermined distance therebetween in the right and left direction. The two shaft mounting parts 22a are disposed in a separated state with a predetermined distance therebetween in the right and left direction. The turning center shaft 34 is disposed so that an axial direction of the turning center shaft 34 and the right and left direction are coincided with each other. The connecting shaft 35 is disposed so that an axial direction of the connecting shaft 35 and the right and left direction are coincided with each other.

The turning center shafts 34 are mounted to one end sides of the shaft mounting parts 21a and 22a, and the connecting shafts 35 are mounted to the other end sides of the shaft mounting parts 21a and 22a. Both ends of the turning center shafts 34 are protruded to an outside in the right and left direction relative to the shaft mounting parts 21a and 22a. Both the end portions of the turning center shafts 34 protruded to the outside in the right and left direction relative to the shaft mounting parts 21a and 22a are mounted to a frame (not shown) of the card reader main body 4. The arms 21 and 22 are held by the frame of the card reader main body 4 so as to be turnable about the corresponding turning center shafts 34. The connecting shafts 35 are inserted through the shaft insertion parts 18a of the spring holder 18. The spring holder 18 and the arms 21 and 22 are turnably connected to each other.

The turning center shaft 34 that is mounted to the arm 22 is inserted through the torsion coil spring 24. The torsion coil spring 24 urges the arm 22 in the clockwise direction shown in FIGS. 5A, 5B, 6A, and 6B about the turning center shaft 34 mounted to the arm 22, and urges the IC contact block 10 toward the front side via the arm 22. The stoppers 25 and 26 are fixed to the frame (not shown) of the card reader main body 4. The stopper 25 is disposed at a position where a front face of the spring holder 18 is abuttable with the stopper 25. The stopper 26 is disposed at a position where the front face of the spring holder 18 is abuttable with the stopper 26. The stopper 25 may be disposed at a position where the arm 21 is abuttable with the stopper 25. Further, the stopper 26 may be disposed at a position where the arm 22 is abuttable with the stopper 26.

The parallel link mechanism 11 guides the IC contact block 10 so that the IC contact block 10 moves in a state in which a posture of the IC contact block 10 to the card conveying passage 8 is maintained constant. Specifically, as shown in FIGS. 5A, 5B, 6A, and 6B, the parallel link mechanism 11 guides the IC contact block 10 so that the IC contact block 10 moves in the state in which a parallel state between the card conveying passage 8 and the spring holder 18 is maintained as viewed in the right and left direction.

Further, the parallel link mechanism 11 guides the IC contact block 10 so that the IC contact block 10 moves to a standby position 10A (a position shown in FIG. 5A) where the IC contact block 10 is abutted with the stopper 25 by an urging force of the torsion coil spring 24 and is separated from the card 2 located on the card conveying passage 8, a communication position 10B (a position shown in FIG. 5B) where the IC contact spring 3 is contacted with the external connection terminal 2a on the card 2 located on the card conveying passage 8, and a card eject position 10C (a position shown in FIG. 6A) where the IC contact block 10 is abutted with the stopper 26 and is separated from the card 2 located on the card conveying passage 8. In other words, the IC contact block 10 is guided by the parallel link mechanism 11 to move upward and downward while sliding in the front and rear direction.

As shown in FIGS. 5A, 5B, 6A, and 6B, the IC contact block 10 located at the standby position 10A and the IC contact block 10 located at the card eject position 10C are disposed on the upper side relative to the IC contact block 10 located at the communication position 10B. As shown in FIG. 5B, when the IC contact block 10 is located at the communication position 10B, the fixing stopper 18c is located at a position where the rear end of the card 2 is abuttable with the fixing stopper 18*c*. Further, as shown in FIG. 6A, when the IC contact block 10 is located at the card eject position 10C, the fixing stopper 18*c* is disposed on the upper side relative to the card 2. In other words, when the IC contact block 10 is located at the card eject position 10C, the fixing stopper 18*c* is located at a position where the rear end of the card 2 is not abutted with the fixing stopper 18*c*. In the case that the IC contact block 10 is located at the standby position 10A, the fixing stopper 18*c* may be located at a position where the rear end of the card 2 is abutted with the fixing stopper 18*c* or may be located at a position where the rear end of the card 2 is not abutted with the fixing stopper 18*c*.

In this embodiment, during standby before the card 2 is inserted into the card reader 1, the IC contact block 10 is located at the standby position 10A by the urging force of the torsion coil spring 24. Further, during the standby, the turning stopper 19 is located at the closing position 19A to close the card conveying passage 8. In this state, when the card 2 is inserted through the insertion port 7, then, the card 2 is conveyed toward the rear side by the card conveying mechanism 9.

When the rear end of the card 2 conveyed to the rear side by the card conveying mechanism 9 is abutted with the turning stopper 19 of the IC contact block 10 located at the standby position 10A, the turning stopper 19 is pushed by the card 2, so that the IC contact block 10 moves toward the rear side from the standby position 10A to the communication position 10B (see FIGS. 5A and 5B). At this time, the card 2 is abutted with the fixing stopper 18*c* in the course of at least movement of the IC contact block 10 from the standby position 10A to the communication position 10B, so that the fixing stopper 18*c* is also pushed by the card 2. For example, when the IC contact spring 3 is contacted with the external connection terminal 2*a* of the IC chip, the card 2 is abutted with the fixing stopper 18*c*, so that the fixing stopper 18*c* is also pushed by the card 2.

In a case that the card reader 1 performs normal processing, in the state in which the IC contact block 10 is located at the communication position 10B, data communication between the card 2 and the card reader 1 is performed. The card 2 is then conveyed toward the front side and is ejected from the insertion port 7. In the state in which the IC contact block 10 is located at the communication position 10B, when the card 2 is conveyed toward the front side, the IC contact block 10 moves to the standby position 10A by the urging force of the torsion coil spring 24.

The card reader main body 4 is provided with a detection mechanism for detecting that the IC contact block 10 is located at the communication position 10B. This detection mechanism is structured of, for example, an optical sensor that is mounted to the card reader main body 4, and a detection piece that is formed on the spring holder 18. When the detection piece of the spring holder 18 intercepts between a light emitting element and a light receiving element of the optical sensor, the detection mechanism detects that the IC contact block 10 is located at the communication position 10B.

In collecting the card 2 in the card reader 1, the card 2 which has been abutted with the turning stopper 19 of the IC contact block 10 moved to the communication position 10B is further conveyed toward the rear side by the card conveying mechanism 9. When the card 2 which has been abutted with the turning stopper 19 of the IC contact block 10 moved to the communication position 10B is further conveyed toward the rear side, the turning stopper 19 is pushed by the card 2, so that the IC contact block 10 moves toward the rear side from the communication position 10B to the card eject position 10C (see FIGS. 5B and 6A). At this time, the card 2 is abutted with the fixing stopper 18*c* in the course of movement of the IC contact block 10 from the communication position 10B to the card eject position 10C, so that the fixing stopper 18*c* is also pushed by the card 2.

Further, in collecting the card 2 in the card reader 1, the card 2 which has been abutted with the turning stopper 19 of the IC contact block 10 moved to the card eject position 10C is further conveyed toward the rear side by the card conveying mechanism 9. When the card 2 which has been abutted with the turning stopper 19 of the IC contact block 10 moved to the card eject position 10C is further conveyed toward the rear side, as shown in FIG. 6B, the turning stopper 19 is turned (tilted) toward the upper side and the rear side about the fixed shaft 30, so that the card 2 is passed by the lower side of the turning stopper 19 toward the rear side. In other words, when the card 2 which has been abutted with the turning stopper 19 of the IC contact block 10 moved to the card eject position 10C is further conveyed toward the rear side, the turning stopper 19 is turned in a counterclockwise direction shown in FIGS. 5A, 5B, 6A, and 6B, so that the card 2 is passed by the lower side of the turning stopper 19 toward the rear side. At this time, the roller 32 is contacted with the upper face of the card 2 and is rotated along with the movement of the card 2.

As described above, in this embodiment, the urging force of the torsion coil spring 20 is set so that the turning stopper 19 is not turned until the IC contact block 10 is abutted with the stopper 26 (in other words, until the IC contact block 10 reaches the card eject position 10C) even when the turning stopper 19 is pushed by the card 2 abutted with the turning stopper 19. As shown in FIG. 7, the turning stopper 19 pushes the card 2 passed by the lower side of the turning stopper 19 toward the rear side, toward the collecting box 5 by the urging force of the torsion coil spring 20. In other words, the turning stopper 19 pushes, toward the lower side, the card 2 passed by the lower side of the turning stopper 19 toward the rear side. Specifically, the roller 32 is contacted with the upper face of the card 2 to push the card 2 toward the lower side.

Further, a rear end side of the card conveying passage 8 is provided with a guide part 40 that is protruded from an upper side to a lower side of the card conveying passage 8 and is structured to guide the card 2 conveyed by the card conveying mechanism 9. In other words, the guide part 40 guides the card 2 toward the lower side of the card conveying passage 8. Further, the guide part 40 is formed integrally with the frame (not shown) of the card reader main body 4 that forms the card conveying passage 8. The guide part 40 is formed at a position different from the positions of the IC contact block 10, drive roller 14, and pad roller 15 in the right and left direction. In other words, the guide part 40, the IC contact block 10, the drive roller 14, and the pad roller 15 are disposed so as not to interfere with each other. Further, when the IC contact block 10 is located at the communication position 10B, the guide part 40 is formed at a position where the guide part 40 is overlapped with the fixing stopper 18*c* in the front and rear direction. More specifically, the guide part 40 is located at a position where the guide part 40 is overlapped in the front and rear direction with a tip end of the card 2 abutted with the fixing stopper 18*c* at the time when the IC contact block 10 is disposed on the lowermost side in the upper and lower direction. Further, when the IC contact block 10 is located at the card eject position 10C, a lower end of the guide part 40 is disposed on the lower side in the upper and lower direction relative to the lower end of the fixing stopper 18c.

In collecting the card 2 in the card reader 1, in a case that the card 2 is abutted with the fixing stopper 18c to push the fixing stopper 18c in the course of movement of the IC contact block 10 from the communication position 10B to the card eject position 10C, a frictional force is generated between the fixing stopper 18c and the tip end of the card 2 abutted with the fixing stopper 18c, so that the card 2 is not separated from the fixing stopper 18c and the tip end of the card 2 is lifted toward the upper side of the card conveying passage 8. At this time, the guide part 40 is abutted with an upper face on a tip end side of the card 2 to push down the tip end of the card 2 lifted toward the upper side, to the lower side relative to the lower end of the fixing stopper 18c. Along with the movement of the card 2 to the rear side, the tip end of the card 2 is guided by the guide part 40, is thus separated from the fixing stopper 18c, and then is guided toward the distal end side of the turning stopper 19, that is, toward the roller 32. As a result, the card 2 is passed by the lower side of the guide part 40, is ejected by the action of the turning stopper 19, and is surely collected in the collecting box.

(Principal Effects in this Embodiment)

As described above, in this embodiment, the IC contact block 10 moves to the standby position 10A where the IC contact block 10 is abutted with the stopper 25 and is separated from the card 2 located on the card conveying passage 8, the communication position 10B where the IC contact spring 3 is contacted with the external connection terminal 2a of the card 2 located on the card conveying passage 8, and the card eject position 10C where the IC contact block 10 is abutted with the stopper 26 and is separated from the card 2 located on the card conveying passage 8, in the state in which the posture of the IC contact block 10 to the card conveying passage 8 is maintained constant. Also in this embodiment, when the card 2 which has been abutted with the turning stopper 19 of the IC contact block 10 moved to the communication position 10B is further conveyed toward the rear side, the turning stopper 19 is pushed by the card 2, and the IC contact block 10 moves toward the rear side from the communication position 10B to the card eject position 10C. In this embodiment, therefore, in collecting the card 2 that is conveyed to the rear side, the IC contact spring 3 is separated from the card 2 along with the movement of the card 2. In this embodiment, accordingly, occurrence of damage to the card 2 owing to the IC contact spring 3 in collecting the card 2 can be suppressed.

Also in this embodiment, when the card 2 which has been abutted with the turning stopper 19 of the IC contact block 10 moved to the card eject position 10C is further conveyed toward the rear side, the turning stopper 19 is turned toward the upper side and the rear side about the fixed shaft 30, so that the card 2 is passed by the lower side of the turning stopper 19 toward the rear side. In this embodiment, therefore, as compared with the case that the IC contact block 10 is moved to the extent that the card 2 can be passed by the lower side of the stopper fixed to the IC contact block 10, the card 2 can be passed toward the rear side of the IC contact block 10 even when the amount of movement of the IC contact block 10 is reduced. In this embodiment, in other words, the amount of movement of the IC contact block 10 can be reduced although the card 2 can be passed toward the rear side of the IC contact block 10 in order to collect the card 2. In this embodiment, accordingly, the space for moving the IC contact block 10 can be reduced. As a result, the card reader 1 can be miniaturized.

In this embodiment, when the IC contact block 10 is located at the communication position 10B, the fixing stopper 18c is located at a position where the rear end of the card 2 is abutted with the fixing stopper 18c. In this embodiment, accordingly, even when the turning stopper 19 that is turnable is mounted to the spring holder 18 in order to miniaturize the card reader 1, the card 2 can be surely stopped at a predetermined position by the fixing stopper 18c, in performing data communication in such a manner that the IC contact spring 3 is contacted with the external connection terminal 2a on the card 2. Also in this embodiment, the fixing stopper 18c is disposed on the upper side relative to the card 2 when the IC contact block 10 is located at the card eject position 10C. Therefore, the fixing stopper 18c does not hinder the card 2 from being passed toward the rear side of the IC contact block 10.

In this embodiment, the fixing stopper 18c is formed on both the sides of the turning stopper 19 in the right and left direction. In this embodiment, therefore, as compared with the case that the fixing stopper 18c is formed on one side of the turning stopper 19 in the right and left direction, the tilting of the card 2 (specifically, the tilting of the card 2 in the front and rear direction as viewed in the upper and lower direction) can be suppressed in performing data communication in such a manner that the IC contact spring 3 is contacted with the external connection terminal 2a on the card 2.

In this embodiment, the roller 32 is mounted to the distal end side of the turning stopper 19. The roller 32 is contacted with the upper face of the card 2 at the time when the card 2 is passed by the lower side of the turning stopper 19 toward the rear side. In this embodiment, therefore, occurrence of damage to the card 2 owing to the turning stopper 19 in collecting the card 2 can be prevented. Also in this embodiment, the turning stopper 19 pushes, toward the collecting box 5, the card 2 passed by the lower side of the turning stopper 19 toward the rear side. Therefore, the card can be surely dropped into the collecting box 5 by use of the turning stopper 19.

In this embodiment, when the IC contact block 10 pushed by the card 2 conveyed along the card conveying passage 8 moves from the communication position 10B to the card eject position 10C, a frictional force is acted between the fixing stopper 18c and the tip end of the card 2 abutted with the fixing stopper 18c so that the tip end of the card 2 abutted with the fixing stopper 18c is lifted toward the upper side. Therefore, in cases of conveying a deformed card 2, the fixing stopper 18c is not separated from a tip end of the card 2, which may result in jamming. In this embodiment, when the IC contact block 10 is located at the communication position 10B, the guide part 40 is formed at a position where the guide part 40 is overlapped with the fixing stopper 18c in the front and rear direction. Further, when the IC contact block 10 is located at the card eject position 10C, the lower end of the guide part 40 is disposed on the lower side in the upper and lower direction relative to the lower end of the fixing stopper 18c. In this embodiment, therefore, in the state in which the IC contact block 10 is located at the communication position 10B, when the card 2 is conveyed toward the rear side relative to the fixing stopper 18c, the guide part 40 is abutted with the upper face on the tip end side of the card 2 to push down the tip end of the card 2 lifted to the upper side by the frictional force, toward the lower side relative to the lower end of the fixing stopper 18c. Accordingly, the fixing stopper 18c can be surely separated from the tip end of the card 2 along with the movement of the card 2, so that the card 2 can be ejected toward the rear side of the IC contact block 10.

(Other Embodiments)

Described above is an example of at least an embodiment according to the present invention. However, the present invention is not limited to the above embodiment and various variations and modifications may be made without changing the concept of the present invention.

In the embodiment described above, the guide mechanism that guides the IC contact block 10 is the parallel link mechanism 11. However, the present invention is not limited to this embodiment. For example, the guide mechanism that guides the IC contact block 10 may be structured of a guide groove that is formed in one of the frame of the card reader main body 4 and the spring holder 18, and a pin that is formed on the other one of the frame of the card reader main body 4 and the spring holder 18 and is engaged with the guide groove. In this case, the IC contact block 10 is guided toward the standby position 10A, the communication position 10B, and the card eject position 10C by the guide groove and the pin.

In the embodiment described above, the roller 32 is mounted to the distal end side of the turning stopper 19. Alternatively, the roller 32 is not necessarily mounted to the distal end side of the turning stopper 19. Also in the embodiment described above, the fixing stopper 18*c* is formed on both the sides of the turning stopper 19 in the right and left direction. Alternatively, the fixing stopper 18*c* may be formed on one side of the turning stopper 19 in the right and left direction. Further, the spring holder 18 is not necessarily formed with the fixing stopper 18*c*.

In the embodiment described above, the turning stopper 19 is urged by the torsion coil spring 20. Alternatively, the turning stopper 19 may be urged by any spring member such as a tension coil spring. Also in the embodiment described above, the IC contact block 10 is urged by the torsion coil spring 24. Alternatively, the IC contact block 10 may be urged by any spring member such as a tension coil spring. Also in the embodiment described above, the card 2 is a card made of vinyl chloride whose thickness is about 0.7-0.8 mm. Alternatively, the card 2 may be a PET (polyethylene terephthalate) card whose thickness is about 0.18-0.36 mm and may be a paper card having a predetermined thickness.

In the embodiment described above, the guide part 40 is formed integrally with the frame of the card reader main body 4. Alternatively, the guide part 40 may be provided as a roller that is held by the frame of the card reader main body 4. In this case, since friction to be generated when the card 2 is passed under the guide part 40 can be reduced, occurrence of damage to the card 2 can be suppressed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A contact type IC card reader for use with a card comprising an IC chip having an external connection terminal, of the IC card reader is on which the card is inserted is referred to as a front side, a side opposite to the front side is referred to as a rear side, one side in a thickness direction of the card inserted through the insertion port is referred to as a first direction side, and a side opposite to the first direction side is referred to as a second direction side, the IC card reader comprising:
- a card conveying passage through which the card is conveyed
- a card conveying mechanism structured to convey the card along the card conveying passage;
- an IC contact block comprising an IC contact spring structured to contact the external connection terminal of the card;
- a guide mechanism structured to guide the IC contact block so that the IC contact block moves in a state in which a posture of the IC contact block to the card conveying passage remains constant;
- a block urging member structured to urge the IC contact block toward the front side;
- a first stopper structured to restrict a moving range of the IC contact block toward the front side; and
- a second stopper structured to restrict a moving range of the IC contact block toward the rear side, wherein the guide mechanism is structured to guide, by an urging force of the block urging member, the IC contact block so that the IC contact block moves to a standby position where the IC contact block is abutted with the first stopper and is separated from the card located on the card conveying passage, a communication position where the IC contact spring is contacted with the external connection terminal on the card located on the card conveying passage, and a card eject position where the IC contact block is abutted with the second stopper and is separated from the card located on the card conveying passage, at the standby position and the card eject position, the IC contact block is disposed on the first direction side relative to the IC contact block at the communication position, the IC contact block comprises:
- a block-shaped spring holder that holds the IC contact spring;
- a turning stopper that is mounted to a rear end side of the spring holder and is structured to turn with a width direction of the card as an axial direction of turning, the width direction being perpendicular to a conveying direction of the card and the thickness direction of the card; and
- a stopper urging member structured to urge the turning stopper toward a closing position where the turning stopper is protruded from the spring holder toward the second direction side to close the card conveying passage, wherein the turning stopper and the IC contact block are structured such that, when a rear end of the card conveyed toward the rear side by the card conveying mechanism is abutted with the turning stopper of the IC contact block located at the standby position, the turning stopper is pushed by the card, so that the IC contact block moves toward the rear side from the standby position to the communication position, the turning stopper and the IC contact block are structured such that, when the card which has been abutted with the turning stopper of the IC contact block moved to the communication position is further conveyed toward the rear side by the card conveying mechanism, the turning stopper is pushed by the card, so that the IC contact block moves toward the rear side from the communication position to the card eject position, and the turning stopper and the IC contact block are structured such that, when the card which has been abutted with the turning stopper of the IC contact block moved to the card eject position is further conveyed toward the rear side by the card conveying mechanism, the turning stopper is turned toward the first direction side and the rear side, so that the card is passed by the second direction side of the turning stopper toward the rear side.

2. The IC card reader according to claim 1, wherein the guide mechanism is a parallel link mechanism comprising a first arm turnably connected to a front end side of the spring holder, and a second arm turnably connected to the rear end side of the spring holder.

3. The IC card reader according to claim 1, wherein the rear end side of the spring holder comprises a fixing stopper that is protruded toward the second direction side, an amount of protrusion of the fixing stopper in the second direction is smaller than an amount of protrusion of the turning stopper located at the closing position in the second direction, when the IC contact block is located at the communication position, the fixing stopper is located at a position where the rear end of the card is abuttable with the fixing stopper, and when the IC contact block is located at the card eject position, the fixing stopper is disposed on the first direction side relative to the card.

4. The IC card reader according to claim 3, wherein the fixing stopper is formed on both sides of the turning stopper in the width direction of the card.

5. The IC card reader according to claim 3, wherein the card conveying passage comprises a guide part that is protruded from the first direction side toward the second direction side and is structured to guide the card conveyed along the card conveying passage, when the IC contact block is located at the communication position, the guide part is disposed so as to be overlapped with the fixing stopper in the conveying direction of the card, when the IC contact block is located at the card eject position, a second direction-side end of the guide part is disposed on the second direction side relative to a second direction-side end of the fixing stopper, and the card is passed by the second direction side of the guide part in a course of movement of the IC contact block from the communication position to the card eject position.

6. The IC card reader according to claim 1, wherein a distal end side of the turning stopper is mounted with a roller that is rotatable with the width direction of the card as an axial direction of rotation.

7. The IC card reader according to claim 1 further comprising a collecting box that is disposed on the rear side relative to the IC contact block and on the second direction side relative to the card conveying passage and is structured to collect the card, wherein the turning stopper is structured to push the card passed by the second direction side of the turning stopper toward the rear side, toward the collecting box by an urging force of the stopper urging member.

* * * * *